United States Patent
Suzuki et al.

(10) Patent No.: US 10,176,618 B2
(45) Date of Patent: Jan. 8, 2019

(54) MOBILE TERMINAL DEVICE, METHOD, AND STORAGE MEDIUM FOR DISPLAYING CAPTURED IMAGES

(71) Applicant: JVC KENWOOD Corporation, Yokohama-shi, Kanagawa (JP)

(72) Inventors: Fuminori Suzuki, Yokohama (JP); Ichiro Shishido, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 10 days.

(21) Appl. No.: 15/427,566

(22) Filed: Feb. 8, 2017

(65) Prior Publication Data

US 2017/0228912 A1  Aug. 10, 2017

(30) Foreign Application Priority Data

Feb. 10, 2016  (JP) ................. 2016-023407

(51) Int. Cl.
| | |
|---|---|
| *G09G 1/00* | (2006.01) |
| *G06T 11/80* | (2006.01) |
| *H04W 4/029* | (2018.01) |
| *G09G 5/12* | (2006.01) |
| *H04W 4/02* | (2018.01) |
| *G06F 3/147* | (2006.01) |

(52) U.S. Cl.
CPC .............. *G06T 11/80* (2013.01); *G06F 3/147* (2013.01); *G09G 5/12* (2013.01); *H04W 4/023* (2013.01); *H04W 4/026* (2013.01); *H04W 4/029* (2018.02); *G09G 2340/12* (2013.01); *G09G 2354/00* (2013.01); *G09G 2370/16* (2013.01)

(58) Field of Classification Search
CPC ......... H04W 4/90; H04W 4/80; H04W 84/18; H04W 8/22; H04W 4/14; H04W 88/02; H04W 4/029; H04W 4/21; H04W 4/10; H04W 76/45; H04W 84/08; H04W 24/00; H04W 40/20; H04W 40/32; H04W 4/023; H04W 4/04
See application file for complete search history.

(56) References Cited

U.S. PATENT DOCUMENTS

| | | | | |
|---|---|---|---|---|
| 2012/0008526 A1* | 1/2012 | Borghei | ................ | H04W 4/021 370/254 |
| 2013/0045759 A1* | 2/2013 | Smith | ................... | H04W 4/029 455/456.6 |

FOREIGN PATENT DOCUMENTS

JP    2012-221330 A    11/2012

* cited by examiner

*Primary Examiner* — Kwasi Karikari
(74) *Attorney, Agent, or Firm* — Brundidge & Stanger, P.C.

(57) ABSTRACT

A positioning unit identifies first positional information of a mobile terminal device. A communication unit acquires second positional information identified in the other mobile terminal device. An imaging unit captures an image of a surrounding environment. An acquisition unit acquires information related to a status dependent on an environment surrounding the other mobile terminal device. A display unit displays, in a captured image, another device icon indicating another positioning unit, and displays the acquired information in association with the other device icon.

7 Claims, 14 Drawing Sheets

FIG. 12

| | | | FOURTH MOBILE TERMINAL DEVICE 10d | | | | |
| | | | THIRD MOBILE TERMINAL DEVICE 10c | | | | |
| | | | SECOND MOBILE TERMINAL DEVICE 10b | | | | |
| | | | FIRST MOBILE TERMINAL DEVICE 10a | | | | |
| No | NAME | GROUP | STATUS | POSITIONAL INFORMATION | SPEED | DIRECTION | SIGNAL INTENSITY | UPDATE TIME |
|---|---|---|---|---|---|---|---|---|
| 001 | A | B | C | D1 | E1 | F1 | | I1 |
| 002 | A | B | C | D2 | E2 | F2 | | I2 |
| 003 | A | B | C | D3 | E3 | F3 | | I3 |
| 004 | A | B | C | D4 | E4 | F4 | | I4 |
| 005 | A | B | C | D5 | E5 | F5 | | I5 |
| 006 | A | B | C | D6 | E6 | F6 | | I6 |
| 007 | A | B | C | D7 | E7 | F7 | | I7 |
| 008 | A | B | C | D8 | E8 | F8 | | I8 |
| 009 | A | B | C | D9 | E9 | F9 | | I9 |
| 010 | A | B | C | D10 | E10 | F10 | | I10 |

30

MOBILE TERMINAL DEVICE, METHOD, AND STORAGE MEDIUM FOR DISPLAYING CAPTURED IMAGES

CROSS-REFERENCE TO RELATED APPLICATION

This application is based upon and claims the benefit of priority from the prior Japanese Patent Application No. 2016-023407, filed on Feb. 10, 2016, the entire contents of which are incorporated herein by reference.

BACKGROUND

1. Field

The present invention relates to display technologies and, more particularly, to a mobile terminal device, a method and a storage medium for displaying captured images.

2. Description of the Related Art

Augmented reality (AR) technology enables for superimposing various information on a captured image. For example, the positions of communication terminals located around a given communication terminal are displayed in a background image using the AR technology. Attributes of users using other communication terminals and information related to compatibility between users can also be displayed (e.g., patent document 1).

[patent document 1] JP2012-221330

Information on users using other communication terminals is displayed in a background image. It is therefore revealed where in the neighborhood of the communication terminal other users are found and which users are located in an easy-to-understand manner. However, the related-art display technology does not display sufficient information related to whether communication between communication terminals is enabled or information on communication quality, i.e., information dependent on the environment around the communication terminal.

SUMMARY

To address the aforementioned issue, the mobile terminal device according to one embodiment comprises: a positioning unit that identifies first positional information of the mobile terminal device; a communication unit that communicates with another mobile terminal device and acquires second positional information identified in the other mobile terminal device; an imaging unit that captures an image of an environment surrounding the mobile terminal device; an acquisition unit that acquires information related to a status dependent on an environment surrounding the other mobile terminal device; and a display unit that displays, in an image captured by the imaging unit, another device icon indicating the other mobile terminal device at coordinates derived based on the first positional information identified by the positioning unit and the second positional information acquired by the communication unit, and displays the information acquired by the acquisition unit in association with the other device icon.

Optional combinations of the aforementioned constituting elements, and implementations of the embodiment in the form of methods, apparatuses, systems, recording mediums, and computer programs may also be practiced as additional modes of the present embodiment.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 12 shows a data structure of a database stored in the storage unit according to Embodiment 3;

DETAILED DESCRIPTION

Figure 1:
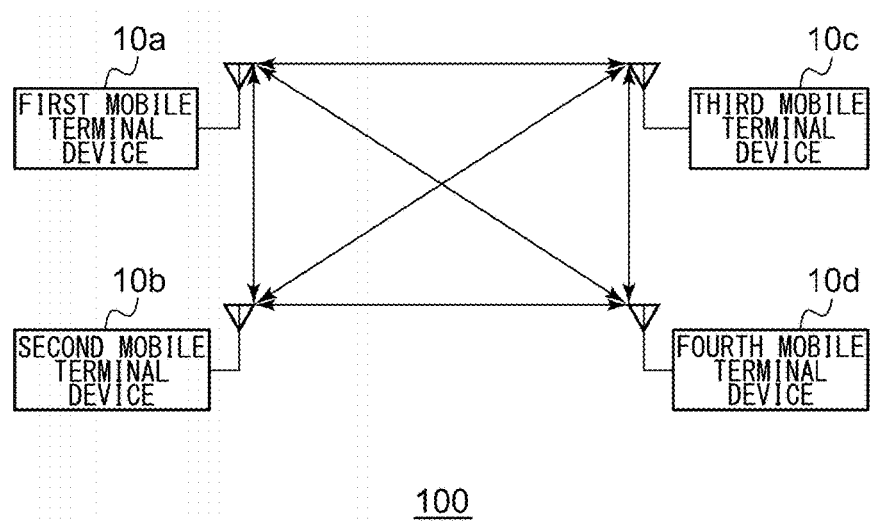
FIG. 1 shows a configuration of a communication system according to Embodiment 1.

The invention will now be described by reference to the preferred embodiments. This does not intend to limit the scope of the present invention, but to exemplify the invention.

Embodiment 1

A brief summary will be given before describing the invention in specific details. Embodiment 1 relates to a communication system including a plurality of mobile terminal devices configured to communicate with each other via a base station device. For example, the communication system is compatible with a business wireless system, and the plurality of mobile terminal devices communicate with each other without being mediated by a base station device. One-to-one mode of communication or one-to-many mode of communication may be used. The latter represents group communication. The mobile terminal device is provided with an imaging device and is capable of displaying augmented reality and acquiring Global Positioning System (GPS) information. The mobile terminal device may be configured as a single device or as a combination of two or more devices. For clarity of description, it will be assumed that the former is the case.

In the latter case, the mobile terminal device is implemented by, for example, a combination of a wireless device compatible with the business wireless system and a smartphone not compatible with the business wireless system. It will be assumed that the wireless device and the smartphone can communicate with each other using a communication system different from the business wireless system, and the wireless device relays communication between the business wireless system and the smartphone. Further, the smartphone may be a device provided with an imaging device and capable of displaying augmented reality and acquiring Global Positioning System (GPS) information. Devices other than a smartphone may be used.

Each mobile terminal device identifies the current position by the GPS function and exchange positional information using the business wireless system. The mobile terminal device superimposes an icon indicating another mobile terminal device (hereinafter, "other device icon") on a captured image of the surrounding environment, by referring to the positional information exchanged. Further, the mobile terminal device measures, as the information related to the status dependent on the environment surrounding the other mobile terminal device, a signal intensity (signal intensity related to received radio waves) of a signal received from the other mobile terminal device, and displays the signal intensity along with the other device icon. The signal intensity as well as the position where the other mobile terminal device is located are displayed in the image of the environment where the other terminal is located. Therefore, the user of the mobile terminal device is presented with an image showing the information related to the status dependent on the surrounding environment. For example, the information may indicate that the signal intensity is lowered because a building is between the mobile terminal device and the other mobile terminal device. Therefore, the user can understand the ease of communication with the other mobile terminal device shown in the image.

FIG. 1 shows a configuration of a communication system 100 according to Embodiment 1. The communication system 100 includes a first mobile terminal device 10a, a second mobile terminal device 10b, a third mobile terminal device 10c, a fourth mobile terminal device 10d, which are generically referred to as mobile terminal devices 10. The number of mobile terminal devices 10 included in the communication system 100 may not be limited to "4." A larger or smaller number of mobile terminal devices may be included. As described above, the plurality of mobile terminal devices 10 are compatible with the business wireless system and perform speech communication and data communication. Further, the first mobile terminal device 10a make a transmission to the second mobile terminal device 10b-fourth mobile terminal device 10d via the base station device 12 in one-to-many mode of communication.

The plurality of mobile terminal devices 10 directly communicate with each other without being mediated by a base station device. For this reason, each of the mobile terminal devices 10 should be located in a range where mutual direction communication is enabled. However, even if the mobile terminal devices 10 are located within a certain proximity, the quality of communication therebetween may not be favorable due to obstacles or geography. Meanwhile, the mobile terminal devices 10 are carried by respective users and so are movable. Therefore, the user using the first mobile terminal device 10a experiencing a poor quality of communication with the second mobile terminal device 10b may, for example, move to a position where communication is improved. In order to implement this, it is desired that information on the status dependent on the environment surrounding the other mobile terminal device 10 be presented to the user in an easy-to-understand manner.

Such presentation is implemented by, for example, an application program run in the mobile terminal device 10. In the following description, the process for implementing such presentation is described. For ease of description, it is assumed that the status of the second mobile terminal device 10b, etc. around the first mobile terminal device 10a is presented to the user of the first mobile terminal device 10a. Such a process is performed similarly in the other mobile terminal devices 10.

Figure 2:
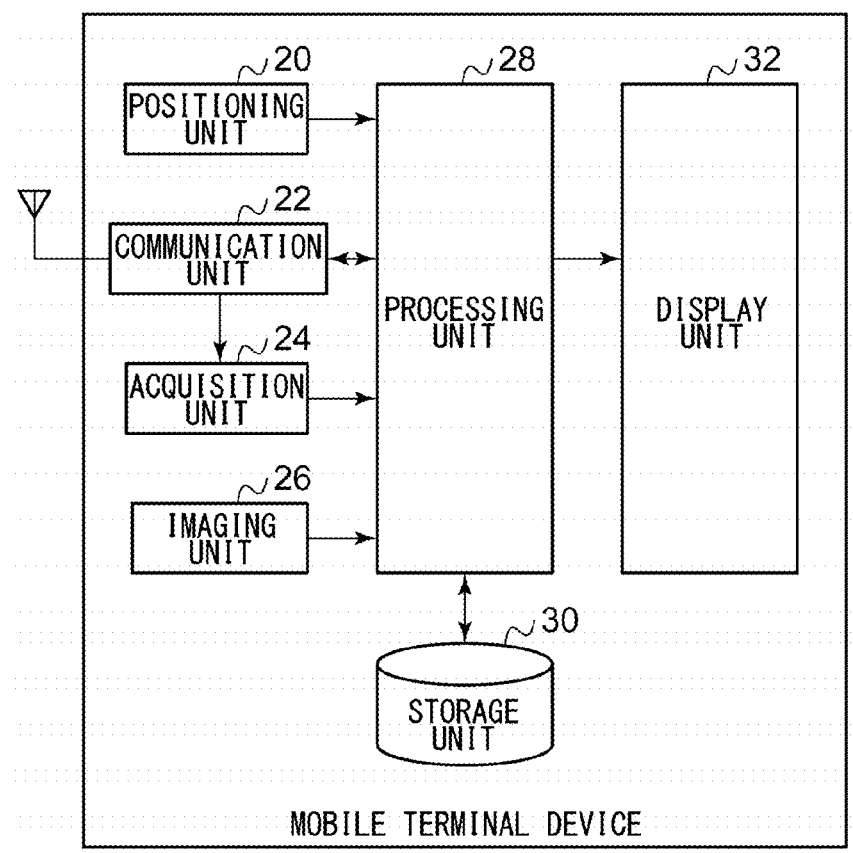
FIG. 2 shows a configuration of the mobile terminal device of FIG. 1.

FIG. 2 shows a configuration of the mobile terminal device 10. The mobile terminal device 10 includes a positioning unit 20, a communication unit 22, an acquisition unit 24, an imaging unit 26, a processing unit 28, a storage unit 30, and a display unit 32. The configuration is common to the first mobile terminal device 10a through the fourth mobile terminal device 10d of FIG. 1.

The positioning unit 20 identifies the position where the mobile terminal device 10 is located by receiving a signal from a GPS satellite (not shown). The position is indicated by, for example, latitude, longitude, and altitude. For GPS positioning, a publicly known technology may be used so that a description thereof is omitted. In addition to the position, the moving speed and moving direction may be detected. The positioning unit 20 is provided with a function of electronic compass and identifies the direction that the mobile terminal device 10 currently faces. The positioning unit 20 outputs these items of information (hereinafter, referred to as "first positional information") to the processing unit 28.

For example, the communication unit 22 is compatible with the business wireless system and communicates with another mobile terminal device 10 via the base station device 12. The communication unit 22 receives the first positional information from the processing unit 28 and transmits a signal including the first positional information to the other mobile terminal device 10. Meanwhile the communication unit 22 receives a signal from the other mobile terminal device 10. The signal includes information (hereinafter, referred to as "second positional information") identified in the other mobile terminal device 10. The communication unit 22 outputs the second positional information to the processing unit 28.

The imaging unit 26 captures an image of the environment surrounding the mobile terminal device 10. The surrounding environment corresponds to the scenery around the mobile terminal device 10. It should be noted that the image may be a still image or moving images. The imaging unit 26 outputs the captured image to the processing unit 28. The output image may be digital data. The image as digital data is also referred to as "image."

The acquisition unit 24 acquires the information related to the status dependent on the environment surrounding the other mobile terminal device 10. The acquisition unit 24 measures, as the information related to the status dependent on the environment surrounding the other mobile terminal device 10, the signal intensity of a signal from the other mobile device 10 received by the communication unit 22. The signal may or may not include the second positional information. The acquisition unit 24 outputs a combination (hereinafter, also referred to as "signal intensity") of the measured signal intensity and the information on the other mobile terminal device transmitting the signal for measuring the signal intensity to the processing unit 28.

The signal intensity may be transmitted from the communication unit 22 to the other mobile terminal device 10. In this case, the signal received by the communication unit 22 from the other mobile terminal device 10 includes the signal intensity measured in the other mobile terminal device 10 based on the signal transmitted from the host user's mobile terminal device 10. The acquisition unit 24 may use, as the information related to the status dependent on the environment surrounding the other mobile terminal device 10, the signal intensity included in the signal received by the communication unit 22. In other words, the signal intensity of a signal received by the communication unit 22 from the other mobile terminal device 10, or the signal intensity of a signal received by the other mobile terminal device 10 from the mobile terminal device 10 displaying the image.

The processing unit 28 receives the first positional information from the positioning unit 20, the second positional information from the communication unit 22, the signal intensity from the acquisition unit 24, and the image from the imaging unit 26. The processing unit 28 superimposes the other device icon showing the other mobile terminal device 10 in an augmented space in the image by using AR technology. To describe it more specifically, the processing unit 28 maps coordinates in the image from the imaging unit 26 to the latitude and longitude, by referring to the current position in the first positional information and the information on the direction.

By assigning an arbitrary point in the image to certain fixed latitude and longitude in the image, the latitude and longitude at another point are uniquely derived, if the angle of view of the image is known. For example, given that the coordinates of a first point in the image are (x1, y1), and the coordinates of a second point different from the first point are (x2, y2), the latitude and longitude of the second point are determined if the latitude and longitude of the first point are determined. The processing unit 28 derives the latitude and longitude of the second point by mapping the current position in the first positional information to the first point, and maps coordinates in the image to the latitude/longitude by performing a similar process for different sets of coordinates in the image.

Figure 3:
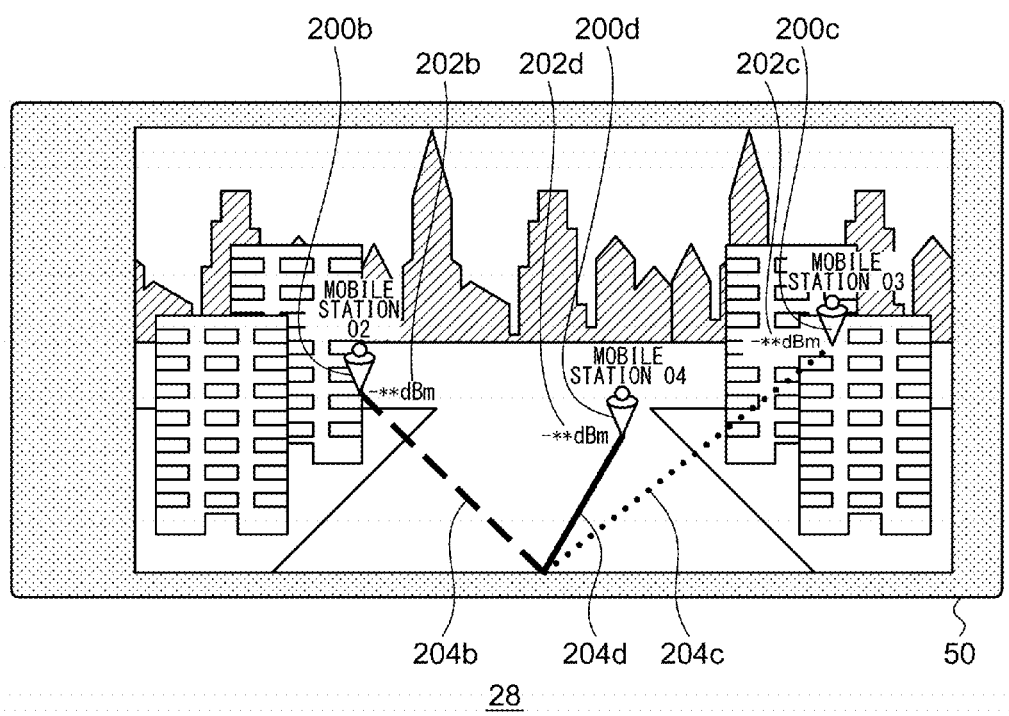
FIG. 3 shows an image generated by the processing unit of FIG. 2.

Further, the processing unit 28 converts the second positional information from the communication unit 22 into coordinates, using the correspondence between coordinates in the image and the latitude/longitude. Further, the processing unit 28 places the other device icon at the post-conversion coordinates in the image. FIG. 3 shows an image 50 generated by the processing unit 28. In the image 50, the scenery around the first mobile terminal device 10*a* is shown and a second other device icon 200*b*, a third other device icon 200*c*, a fourth other device icon 200*d*, which are generically referred to as other device icons 200, are shown in the scenery. The second other device icon 200*b* is an icon for indicating the second mobile terminal device 10*b*, the third other device icon 200*c* is an icon for indicating the third mobile terminal device 10*c*, and the fourth other device icon 200*d* is an icon for indicating the fourth mobile terminal device 10*d*. Therefore, the second other device icon 200*b* is placed at the coordinates corresponding to the latitude and longitude in the second positional information from the second mobile terminal device 10*b*. The same is true of the third other device icon 200*c* and the fourth other device icon 200*d*. The rest of the description will be given later and reference is made back to FIG. 2.

The processing unit 28 places the information on signal intensity acquired by acquisition unit 24 in the image 50, in association with each other device icon 200. Further, the processing unit 28 draws a line (hereinafter, referred to as "transmission channel line") leading to each other device icon 200 to indicate that communication is enabled, defining the bottom center of the image 50 as the position of the first mobile terminal device 10*a*. The processing unit 28 changes the state of display of the transmission channel line in accordance with the value of signal intensity. For example, the processing unit changes 28 modifies color shades, color difference, type of line, boldness of line, etc. For example, the higher the signal intensity, the darker the color or the bolder the line that the processing unit 28 uses. Thus, the processing unit 28 changes the state of display of signal intensity in accordance with the value of signal intensity measured by the acquisition unit 24.

In the image 50 shown in FIG. 3, the second other device information 202*b* is placed in association with the second other device icon 200*b*, and the second other device information 202*b* indicates the signal intensity for the second mobile terminal device 10*b*. A second transmission channel line 204*b* is placed between the first mobile terminal device 10*a* and the second other device icon 200*b*. Such display scheme is also used for the third other device icon 200*c* and the fourth other device icon 200*d*. The second other device information 202*b*, third other device information 202*c*, and fourth other device information 202*d* are generically referred to as other device information 202. The second transmission channel line 204*a*, a third transmission channel line 204*c*, and a fourth transmission channel line 204*d* are generically referred to as transmission channel lines 204.

As described above, the transmission channel line 204 is displayed such that the type of line (solid line/dotted line) or the color of line (dark color/pale color, or different colors) is changed. Different colors may be assigned to different other device icons 200. For example, the second other device icon 200*b* that is relatively remote and blocked from view by a building is associated with a slightly low signal intensity of received signals so that the second transmission channel line 204*b* is represented by a dotted line of a slightly pale color with a small gap between dots. The third other device icon 200*c* that is remote and completely blocked from view by a building is associated with a low signal intensity of received signals so that the third transmission channel line 204*c* is represented by a dotted line of a pale color with a wide gap between dots. If the signal intensity is small, the user of the first mobile terminal device 10*a* may determine to move so that the other party is not blocked from view by the building, by viewing the image 50 displayed. As a result, the quality of communication can be easily improved by moving in that direction. Meanwhile, the fourth other device icon 200*d* located nearby and at a place with good visibility is associated with a high signal intensity of received signals so that the fourth transmission channel line 204*d* is represented by a dark solid line. Reference is made back to FIG. 2.

Figure 4:
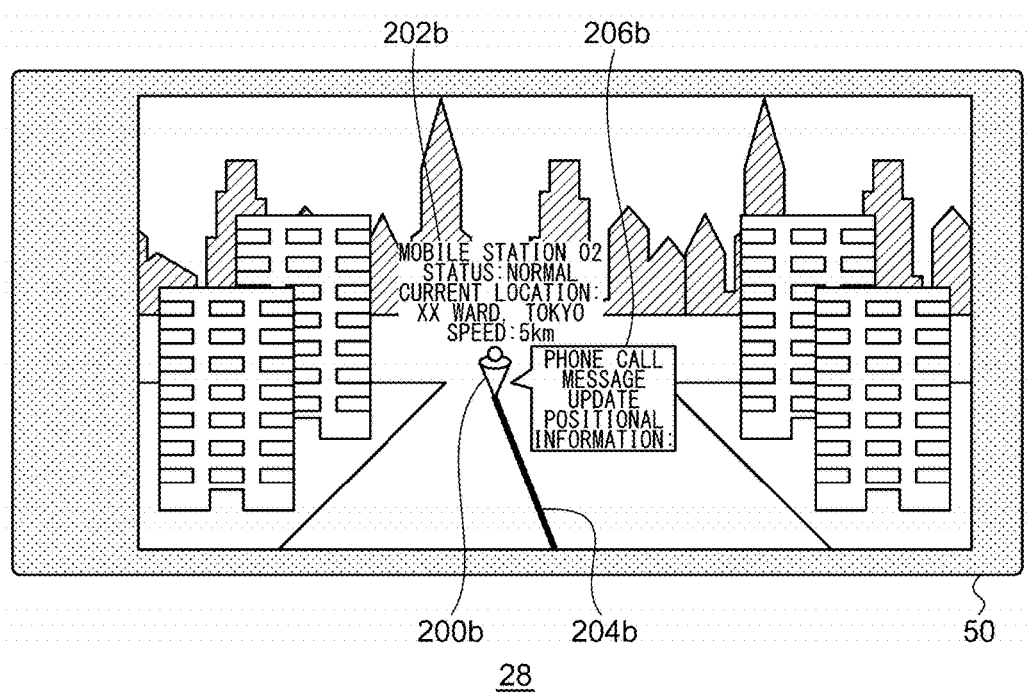
FIG. 4 shows an alternative image generated by the processing unit of FIG. 2.

If the signal from the other mobile terminal device 10 includes information on the status dependent on the environment surrounding the other mobile terminal device 10, the acquisition unit 24 may acquire such information (hereinafter, referred to as "status information") from the signal received by the communication unit 22. The acquisition unit 24 outputs the status information to the processing unit 28, and the processing unit 28 places the status information in the image 50 in association with the other device icon 200. FIG. 4 shows an alternative image 50 generated by the processing unit 28. The second other device information 202*b* is placed in association with the second other device icon 200*b*. Aside from the signal intensity described above, the name, status, location, speed, direction, update time of positional information, etc. can be displayed as the second other device information 202*b*. If the second other device icon 200*b* as displayed is selected by, for example, a tap, a second sub-menu 206*b* is shown in association with the second other device icon 200*b*. Instructions like phone call/message/transmit are shown in the second sub-menu 206*b*. By selecting, for example, "phone call" from the second sub-menu 206b, a phone call with the second mobile terminal device 10b is initiated. Reference is made back to FIG. 2.

The storage unit 30 stores various information used for processes. For example, the storage unit 30 stores the first positional information from the positioning unit 20, the second positional information from the communication unit 22, the signal intensity from the acquisition unit 24, and image from the imaging unit 26. The display unit 32 displays the image 50 generated by the processing unit 28. For example, the image 50 shown in FIG. 3 and FIG. 4 is shown. The display unit 32 may be implemented by a touch-sensitive panel.

The features are implemented in hardware such as a CPU, a memory, or other LSI's of a computer, and in software such as a program loaded into a memory, etc. The figure depicts functional blocks implemented by the cooperation of these elements. Therefore, it will be obvious to those skilled in the art that the functional blocks may be implemented in a variety of manners by hardware only, by software only, or by a combination of hardware and software.

Figure 5:
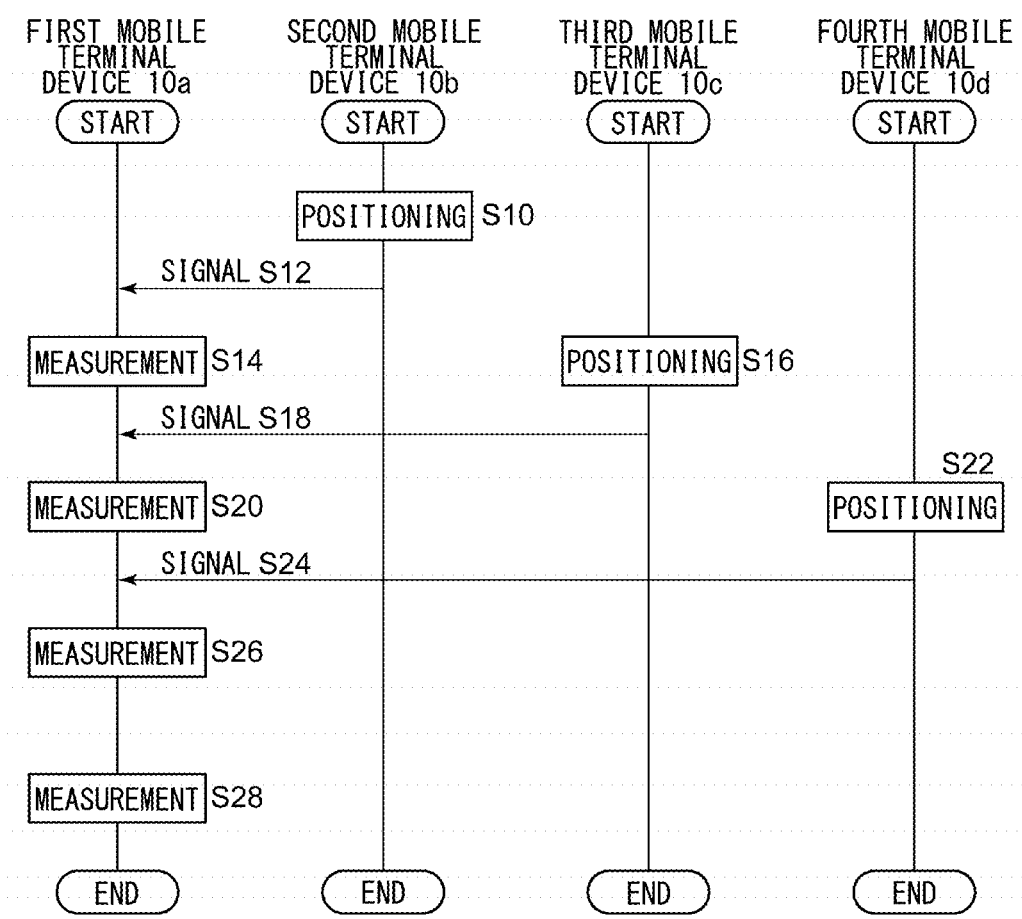
FIG. 5 is a sequence chart showing the steps of displaying performed by the communication system of FIG. 1.

A description will now be given of an operation in the communication system 100 with the above-described configuration. FIG. 5 is a sequence chart showing the steps of displaying performed by the communication system 100. The second mobile terminal device 10b measures the position of the second mobile terminal device 10b (S10) and transmits a signal including the second positional information to the first mobile terminal device 10a (S12). The first mobile terminal device 10a receives the signal and measures the signal intensity (S14). The third mobile terminal device 10c measures the position of the third mobile terminal device 10c (S16) and transmits the signal including the second positional information to the first mobile terminal device 10a (S18). The first mobile terminal device 10a receives the signal and measures the signal intensity (S20). The fourth mobile terminal device 10d measures the position of the fourth mobile terminal device 10d (S22) and transmits the signal including the second positional information to the first mobile terminal device 10a (S24). The first mobile terminal device 10a receives the signal and measures the signal intensity (S26). The first mobile terminal device 10a displays the image 50 (S28).

According to this embodiment, the information related to the status dependent on the environment surrounding the other mobile terminal device is displayed in the image as well as the other device icon. Therefore, the information dependent on the surrounding environment can be displayed in an easy-to-understand manner. The other device icon is displayed at the coordinates of the position of the other mobile terminal device so that the position of the other mobile terminal device is known easily merely by viewing the image. The signal intensity is displayed as the information related to the status dependent on the environment surrounding the other mobile terminal device so that the quality of communication with the other mobile terminal device is known by association. The state of display is changed depending on the signal intensity so that the signal intensity is displayed in an easy-to-understand manner.

Since the signal intensity is displayed, an instruction on a position of proper communication environment can be given. The other device icon and signal intensity are displayed so that the user can know whether communication with the other mobile terminal device is enabled by referring to the distance in the augmented reality or signal intensity. Since the other device icon and signal intensity are displayed, the coverage area can be identified in the augmented reality and the user is prompted to move when communication is disabled. Since the other device icon and signal intensity are displayed, the user is allowed to understand the situation in the event of a problem and act on the user's own initiative so that the problem can be promptly acted upon. The information is displayed in the augmented reality so that the user can understand the situation intuitively.

In the embodiment described above, it is assumed that signal intensity is used as the information related to the status dependent on the environment surrounding the mobile terminal device. Alternatively, other type of information may be used. For example, the microphone for phone talk in the other mobile terminal device picks up certain noise (wind noise, traffic noise, etc.) dependent on the environment surrounding the other mobile terminal device in addition to the voice of the user. The output signal from the microphone may be analyzed in the other mobile terminal device to measure the signal intensity of the noise (sound of surrounding environment) components. The signal intensity may be used as the information related to the status dependent on the environment surrounding the other mobile terminal device. The signal intensity of the noise components may be transmitted from the other mobile terminal device to the mobile terminal device displaying the image (the first mobile terminal device 10a) so that the signal intensity of acoustic noise may be displayed in place of the signal intensity of received radio waves shown in FIG. 3. Alternatively, the speech signal transmitted from the other mobile terminal device may be analyzed in the mobile terminal device displaying the image (the first mobile terminal device 10a) to calculate the signal intensity of the noise components. Still alternatively, the intensity of the noise components may be subtracted from the intensity of the acoustic signal as a whole and the intensity of the components related to the human voice desired to be heard may be calculated and displayed. When it is difficult to hear the voice of the other party, the user of the first mobile terminal device 10a viewing the display screen may direct the other party to move to a position where the acoustic noise is expected to be reduced. For example, the user can identify a space behind a building not affected by the wind directly or a position where less traffic noise is expected by viewing the image. The user may notify the other party of the position with a voice or text message. In this way, the communication quality is improved.

Where the mobile terminal device is provided with a function dependent on the illumination intensity (e.g., charging function of a solar cell), the illumination intensity measured by the other mobile terminal device may be used as the information related to the status dependent on the environment surrounding the other mobile terminal device. Alternatively, the amount of electricity generated by ambient light per a unit time, the amount of electricity charged in a solar cell, or the like may be used as the information relating to the status dependent on the environment surrounding the other mobile terminal device. The amount of electricity generated by ambient light, or the like may be displayed in place of the signal intensity of received radio waves shown in FIG. 3. The user of the mobile terminal device displaying the image (the first mobile terminal device 10a) can guide the mobile terminal device to move to a position where the efficiency of the function dependent on the ambient illumination intensity is increased, by viewing the display screen.

Embodiment 2

A description will now be given of Embodiment 2. As in Embodiment 1, the mobile terminal device according to Embodiment 2 uses AR technology to display other device icons representing other mobile terminal devices in a captured image. In Embodiment 2, as in Embodiment 1, the information related to the status dependent on the environment surrounding the other mobile terminal devices is displayed except that the information displayed is different from that of Embodiment 1. In Embodiment 2, the mobile terminal device receives status information indicating an emergency status from other mobile terminal devices and displays the emergency status in a recognizable manner. The communication system 100 and the mobile terminal device 10 according to Embodiment 2 are of the same type as those of FIGS. 1 and 2. The following description concerns a difference from Embodiment 1.

The communication unit 22 of FIG. 2 receives a signal from the other mobile terminal devices 10. The received signal includes the status information from the other mobile terminal devices 10. The acquisition unit 24 acquires the status information received by the communication unit 22. The status information represents information on the status dependent on the environment surrounding the other mobile terminal devices 10. The status information indicates emergency information. Emergency information represents information output from other mobile terminal devices 10 as emergency notification and is grouped into "EMERGENCY information" and "EMERGENCY MAN-DOWN information." Both represent information indicating urgent situation or emergency. "EMERGENCY information" is output when the user of the other mobile terminal device 10 performs a certain operation. "EMERGENCY MAN-DOWN information" is automatically output when the user carrying the other mobile terminal device 10 falls over. For example, when an explosion accident occurs at a certain spot and the user of the nearby mobile terminal device 10 falls over due to the impact, "EMERGENCY MAN-DOWN" information is output. In this case, the information related to the status "EMERGENCY MAN-DOWN" can be said to be information determined by the surrounding environment such as an explosion accident. A publicly known technology may be used to output emergency information from the other mobile terminal devices 10 so that a description thereof is omitted. The acquisition unit 24 outputs the emergency information to the processing unit 28.

Figure 6:
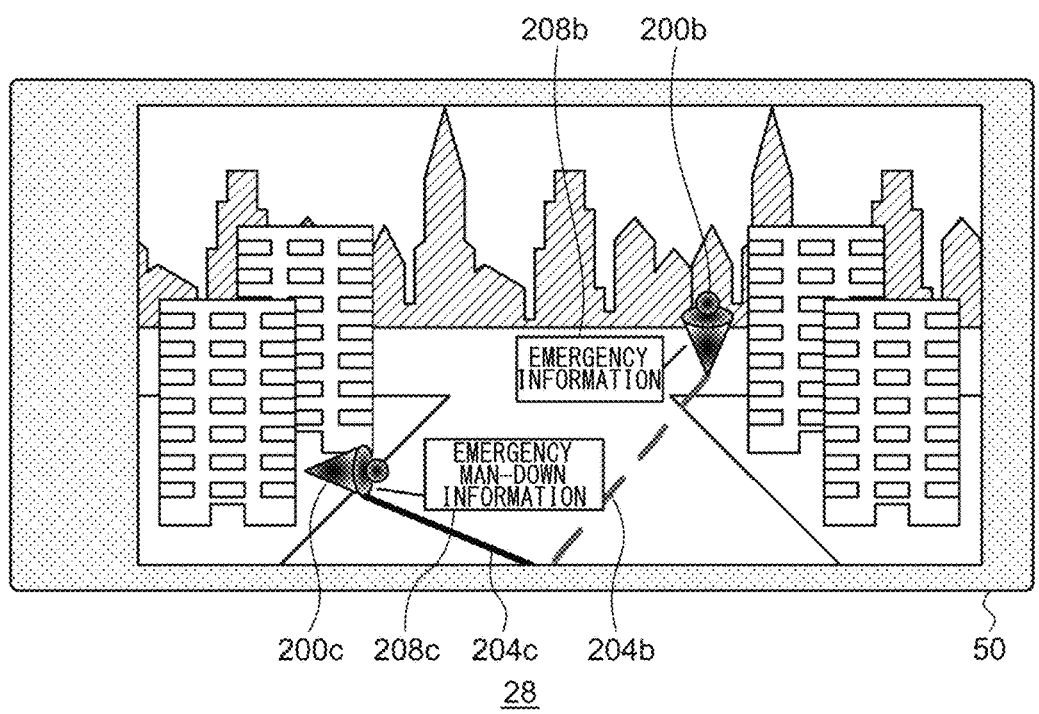
FIG. 6 shows the image generated by the processing unit according to Embodiment 2.

The processing unit 28 additionally receives emergency information (status information) from the acquisition unit 24. The processing unit 28 generates the image 50 by placing the input emergency information in association with the other device icons 200. FIG. 6 shows the image 50 generated by the processing unit 28 according to Embodiment 2. The image 50 is shown as in FIG. 3, etc. It is assumed here that emergency information is acquired from the second mobile terminal device 10b and the third mobile terminal device 10c. The processing unit 28 displays the second other device icon 200b in FIG. 6 in a display state different from that of the second other device icon 200b in FIG. 3 in order to place the emergency information in association with other device icons 200. In other words, the other device icons 200 associated with other mobile terminal devices 10 from which the emergency information is received are displayed in a more noticeable manner in distinction from the other device icons 200 for the other mobile terminal devices 10 in a normal state.

It is assumed that the emergency information from the second mobile terminal device 10b is "EMERGENCY information" and the emergency information from the third mobile terminal device 10c is "EMERGENCY MAN-DOWN information." Therefore, the third other device icon 200c is an icon of a shape showing the user falling over and is displayed in a state different also from that of the second other device icon 200b. Second status information 208b is placed in association with the second other device icon 200b, and third status information 208c is placed in association with the third other device icon 200c. The second status information 208b shows "EMERGENCY information," and the third status information 208c shows "EMERGENCY MAN-DOWN information."

If the degree of urgency (degree of seriousness) of emergency information is categorized into a plurality of levels, the color or shape of the other device icon 200 may be changed depending on the level. Depending on the emergency information, the other device icon 200 may be displayed steadily/changed/blinked/displayed with a changed or blinked background color/displayed in a large size/not displayed. The presentation scheme may be changed or combined. Alternatively, an alert sound may be output. The emergency information may be displayed in all mobile terminal devices 10 receiving the emergency information. Alternatively, the emergency information may be displayed only in those mobile terminal devices 10 in the same group as the mobile terminal device 10 originating the emergency information. Reference is made back to FIG. 2.

The image 50 generated by the processing unit 28 may be different from that of FIG. 6. As mentioned above, the user of the mobile terminal device 10 originating the EMERGENCY MAN-DOWN information has fallen over so that the user is often at a low position. Therefore, the user is blocked from view by other objects or buildings so that the other device icon 200 for the mobile terminal device 10 originating the EMERGENCY MAN-DOWN information is not placed in the image 50. This is addressed by causing the second mobile terminal device 10b to capture an image of the user of the third mobile terminal device 10c originating the EMERGENCY MAN-DOWN information, if it is possible to capture the image by the imaging unit 26 of the second mobile terminal device 10b. The second mobile terminal device 10b transmits the image capturing the user of the third mobile terminal device 10c (hereinafter, referred to as "photo image") to the first mobile terminal device 10a. The communication unit 22 of the first mobile terminal device 10a additionally receives the photo image. The acquisition unit 24 acquires the photo image received by the communication unit 22 and outputs the image to the processing unit 28.

Figure 7:
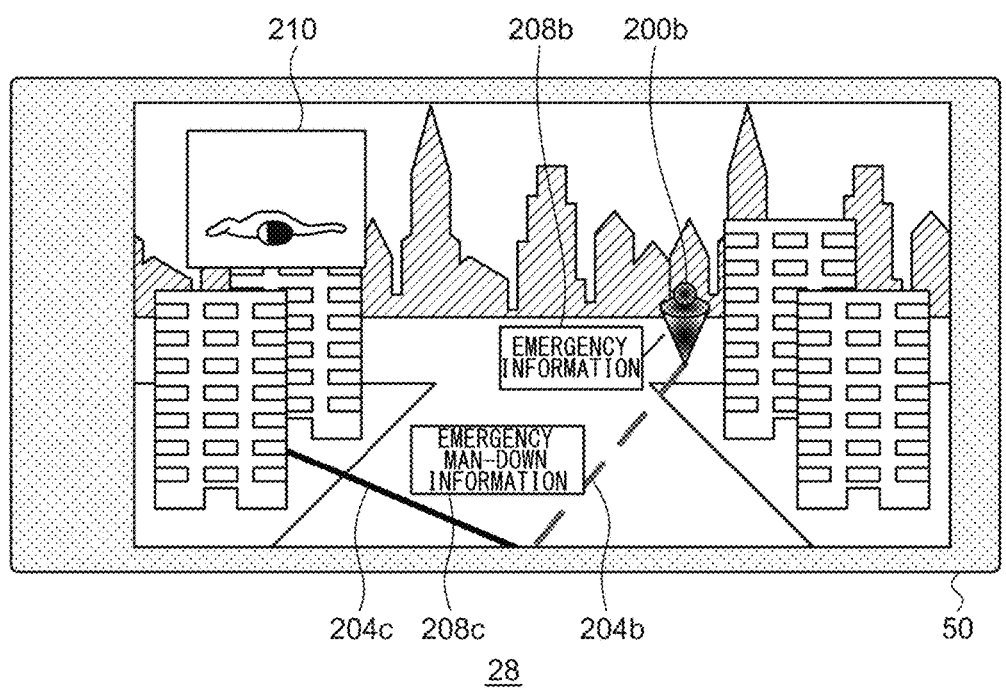
FIG. 7 shows another image generated by the processing unit according to Embodiment 2.

The processing unit 28 generates the image 50 like that of FIG. 6. In this process, the processing unit 28 merges the photo image acquired from the acquisition unit 24. FIG. 7 shows another image 50 generated by the processing unit 28 according to Embodiment 2. The third other device icon 200c is not placed in the image because the associated terminal is blocked from view by a building. Instead, a photo image 210 captured by the second mobile terminal device 10b is shown. The second mobile terminal device 10b may generate an image (image like that of FIG. 6) in which the third mobile terminal device 10c is placed in an augmented space as viewed from the second mobile terminal device 10b, by using the positional information on the third mobile terminal device 10c, the information on the position and direction of the second mobile terminal device 10b, and the information on the angle of view of the imaging unit 26 of the second mobile terminal device 10b, and may transmit the generated image to the first mobile terminal device 10a. In this process, drawing of the transmission channel line 204 is omitted. Reference is made back to FIG. 2.

In the event that the other device icon 200 for the mobile terminal device 10 originating the EMERGENCY MAN-DOWN information is not placed in the image 50, the processing unit 28 may place the other device icon 200 at alternative coordinates different from the coordinates derived based on the first positional information and the second positional information. In this process, the processing unit 28 also places information related to the relationship between the alternative coordinates and the original coordinates (hereinafter, referred to as "coordinate information") in association with the other device icon 200. In other words, when the other device icon 200 is placed at a position different from the position where the other mobile terminal device 10 is actually located, the position of the other mobile terminal device 10 relative to the display position of the other device icon 200 is placed in the form of character information.

Figure 8:
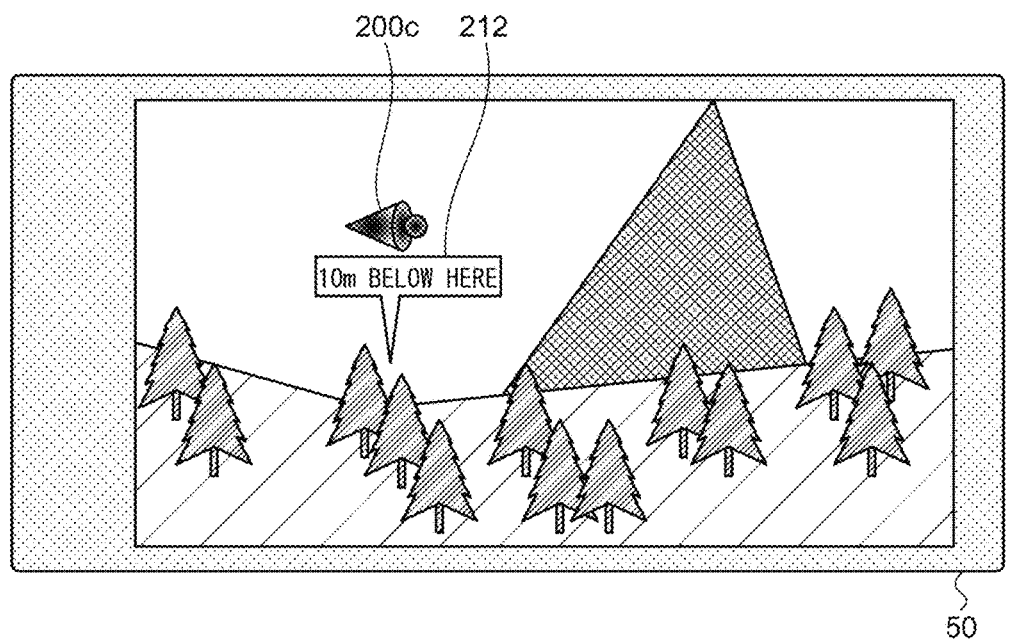
FIG. 8 shows another image generated by the processing unit according to Embodiment 2.

FIG. 8 shows another image 50 generated by the processing unit 28 according to Embodiment 2. For example, if the third mobile terminal device 10c is located at a position of latitude X, longitude Y, and altitude Z (the unit for altitude is [m]), the processing unit 28 places the third other device icon 200c at a position 10 m higher in altitude (Z+10 m). Further, the processing unit 28 places coordinate information 212 showing characters like "10 m below here" in the neighborhood of the third other device icon 200c. This makes it easy to identify the position of the user of the other mobile terminal device 10 falling over behind a building.

Figure 9:
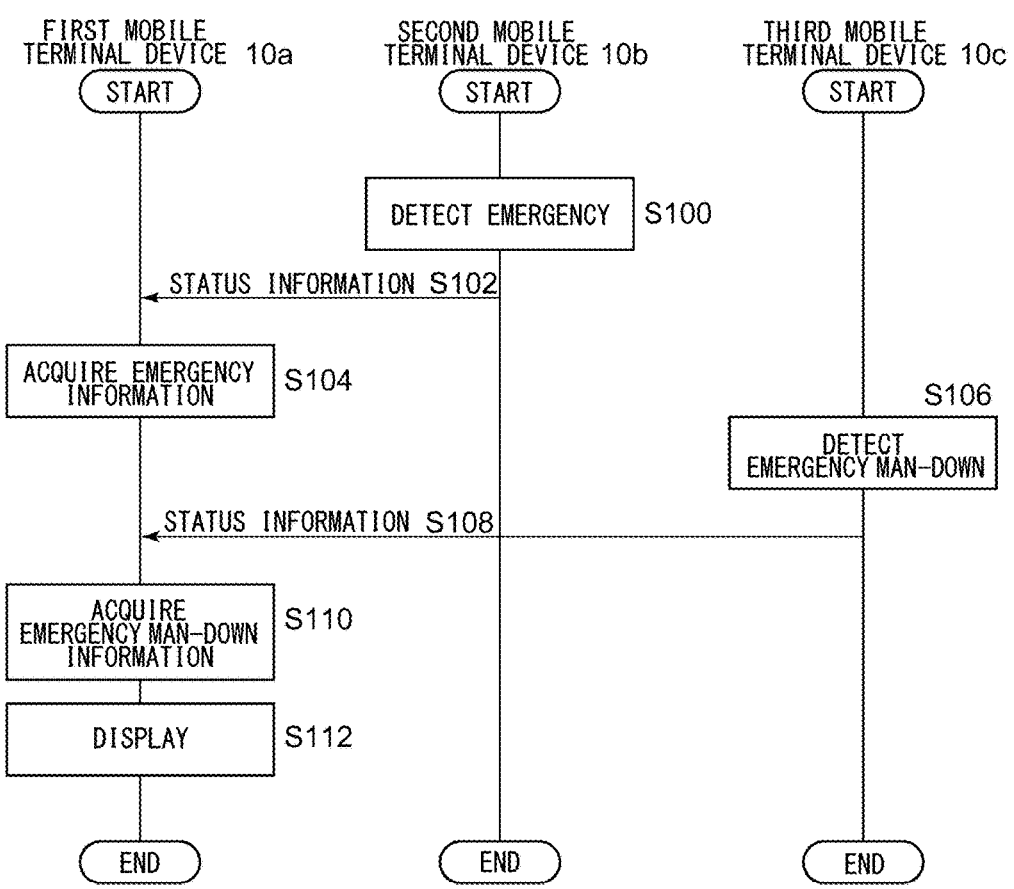
FIG. 9 is a sequence chart showing the steps of displaying performed by the communication system according to Embodiment 2.

A description will now be given of an operation in the communication system 100 with the above-described configuration. FIG. 9 is a sequence chart showing the steps of displaying performed by the communication system 100 according to Embodiment 2. The second mobile terminal device 10b detects an emergency (S100). The second mobile terminal device 10b transmits the status information indicating the EMERGENCY information to the first mobile terminal device 10a (S102) and the first mobile terminal device 10a acquires the EMERGENCY information (S104). The third mobile terminal device 10c detects EMERGENCY MAN-DOWN (S106). The third mobile terminal device 10c transmits the status information indicating the EMERGENCY MAN-DOWN information to the first mobile terminal device 10a (S108) and the first mobile terminal device 10a acquires the EMERGENCY MAN-DOWN information (S110). The first mobile terminal device 10a displays the image 50 (S112).

Figure 10:
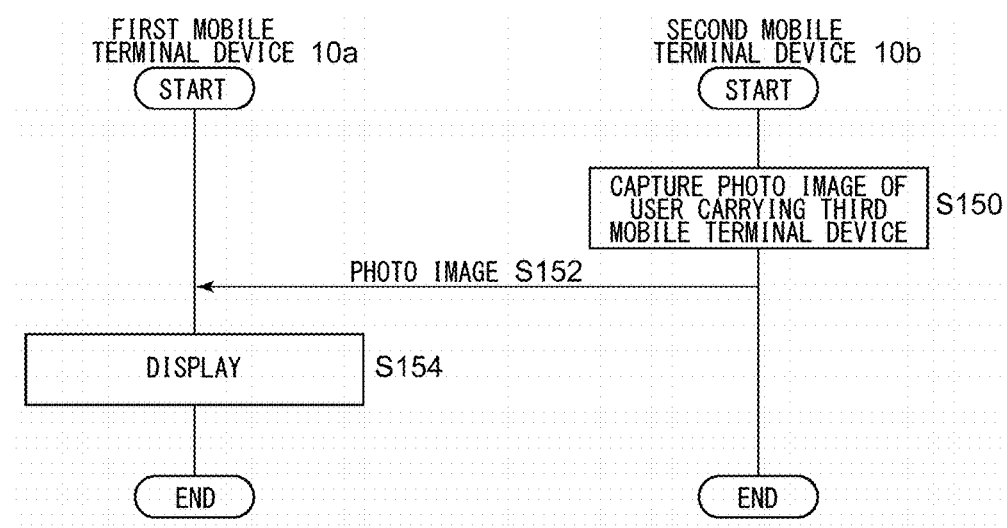
FIG. 10 is a sequence chart showing the alternative steps of displaying performed by the communication system according to Embodiment 2.

FIG. 10 is a sequence chart showing the alternative steps of displaying performed by the communication system 100 according to Embodiment 2. The second mobile terminal device 10b captures a photo image of the user carrying the third mobile terminal device 10c (S150). The second mobile terminal device 10b transmits the photo image to the first mobile terminal device 10a (S152). The first mobile terminal device 10a displays the image 50 merged with the photo image (S154).

Figure 11:
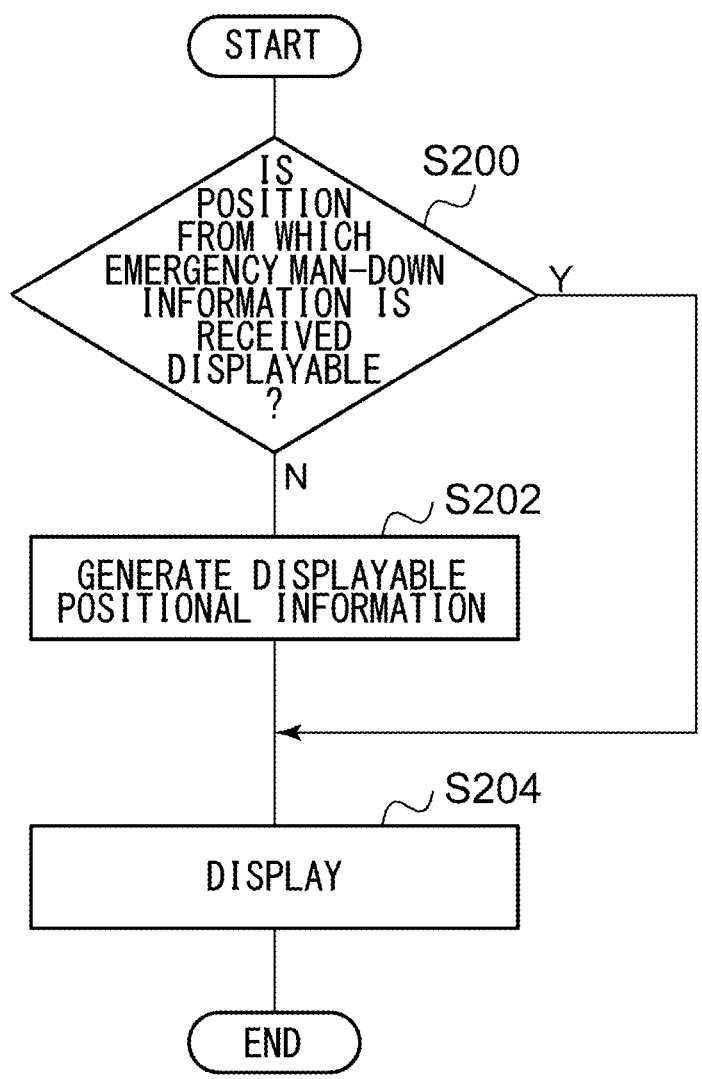
FIG. 11 is a sequence chart showing the steps of displaying performed by the processing unit of FIG. 8.

FIG. 11 is a sequence chart showing the steps of displaying performed by the processing unit 28. If the position of the other mobile terminal device 10 from which the EMERGENCY MAN-DOWN information is acquired cannot be displayed in the image 50 (N in S200), the processing unit 28 increases the altitude, or the like, and generates positional information that can be displayed in the image 50, based on the position of the host mobile terminal device 10 (S202). If the user carrying the other mobile terminal device 10 from which the EMERGENCY MAN-DOWN information is acquired can be displayed in the image 50 (Y in S200), step 202 is skipped. The storage unit 30 displays the image 50.

In other words, if the status of the mobile terminal device 10 meets a certain condition, the position of that mobile terminal device 10 (actual position) may be changed to the position (position for display) that can be displayed in the augmented space of the display screen before being displayed. In this process, information related to a difference (relationship) between the actual position and the position for display may be displayed.

According to this embodiment, the status information from other mobile terminal devices is displayed in association with other device icons, as the information related to the status dependent on the environment surrounding the other mobile terminal devices. Therefore, information dependent on the surrounding environment can be displayed in an easy-to-understand manner. In further accordance with this embodiment, when the EMERGENCY information is acquired, the other device icon is displayed in association so that a notification can be given to indicate that the user carrying the associated mobile terminal device is in an emergency status. When the EMERGENCY MAN-DOWN information is acquired, the other device icon is displayed in association so that a notification can be given to indicate that the user carrying the other mobile terminal device is in an EMERGENCY MAN-DOWN status.

Since the image capturing the user carrying the other mobile terminal originating the EMERGENCY MAN-DOWN information is transmitted from still another mobile terminal device, the presence of the user can be identified even if the user has fallen over and so is blocked from view by an obstacle. Since the other device icon, with its position converted so as to be displayable, is displayed and the relationship between the pre-conversion and post-conversion positions is also displayed, the other device icon is displayed and, also, the true position is made known, even if the other device icon is blocked from view by an obstacle. The status, place, distance, etc. of mobile terminal devices including emergency can be identified in the augmented reality. The emergency status can be displayed in an intuitive, easy-to-understand manner regardless of objects surrounding the mobile terminal devices.

Embodiment 3

A description will now be given of Embodiment 3. As in the foregoing embodiments, the mobile terminal device according to Embodiment 3 uses AR technology to display other device icons representing other mobile terminal devices in a captured image. The mobile terminal device according to Embodiment 3 displays a movement locus of the other device icon and a movement locus of an icon indicating the user's mobile terminal device (hereinafter, referred to as "host device icon") in a captured image. In this process, the signal intensity is also displayed. Showing of the movement locus and signal intensity helps determine a position where it is likely that the communication quality is improved.

The communication system 100, and the mobile terminal device 10 according to Embodiment 3 are of the same type as those of FIGS. 1 and 2. The following description concerns a difference from the foregoing embodiments.

The storage unit 30 of FIG. 2 stores a history of the second positional information as well as storing a history of the first positional information. The storage unit 30 also stores the signal intensity corresponding to the history of the second positional information. The signal intensity stored represents the signal intensity measured by the acquisition unit 24 when the signal including the second positional information is received by the communication unit 22. FIG. 12 shows a data structure of a database stored in the storage unit 30 according to Embodiment 3. As shown in the figure, the history of information including "name," "group," "status," "positional information," "speed," "direction," "signal intensity," and "update time" is stored for each mobile terminal device 10. The description here concerns the process in the first mobile terminal device 10a so that "signal intensity" is not entered in the history of the first mobile terminal device 10a. Reference is made back to FIG. 2.

The processing unit 28 places, in the image captured by the imaging unit 26, the other device icon 200 in association with each history of coordinates derived based on the history of the first positional information and the history of the second positional information stored in the storage unit 30. The process represents performing the process similar to the process described above for each of a plurality of sets of coordinates. Further, the processing unit 28 places the host device icon 220 indicating the user's mobile terminal device 10 in association with each history of coordinates derived based on the history of the first positional information stored in the storage unit 30. The process represents performing the process similar to the process described above only for the first positional information.

Further, the processing unit 28 identifies the second mobile terminal device 10b, which communicated with the first mobile terminal device 10a, and the time when the communication took place. Further, the processing unit 28 identifies a plurality of host device icons 220 which correspond to the first mobile terminal device 10a, and a plurality of other device icons 200 which correspond to the second mobile terminal device 10b. Further, the processing unit 28 identifies those of the identified host device icons 220 and the identified other device icons 200 that are included in a certain range in terms of differences in the time that the communication took place. The processing unit 28 generates the image 50 by drawing, between the other device icon 200 and the host device icon 220 thus identified, a presentation (hereinafter, referred to as "past correspondence line") for associating the other device icon 200 and the host device icon 220. By drawing a past correspondence line, the positions of the first mobile terminal device 10a and the second mobile terminal device 10b occurring when the first mobile terminal device 10a and the second mobile terminal device 10b communicated is displayed in an easy-to-understand manner.

Figure 13:
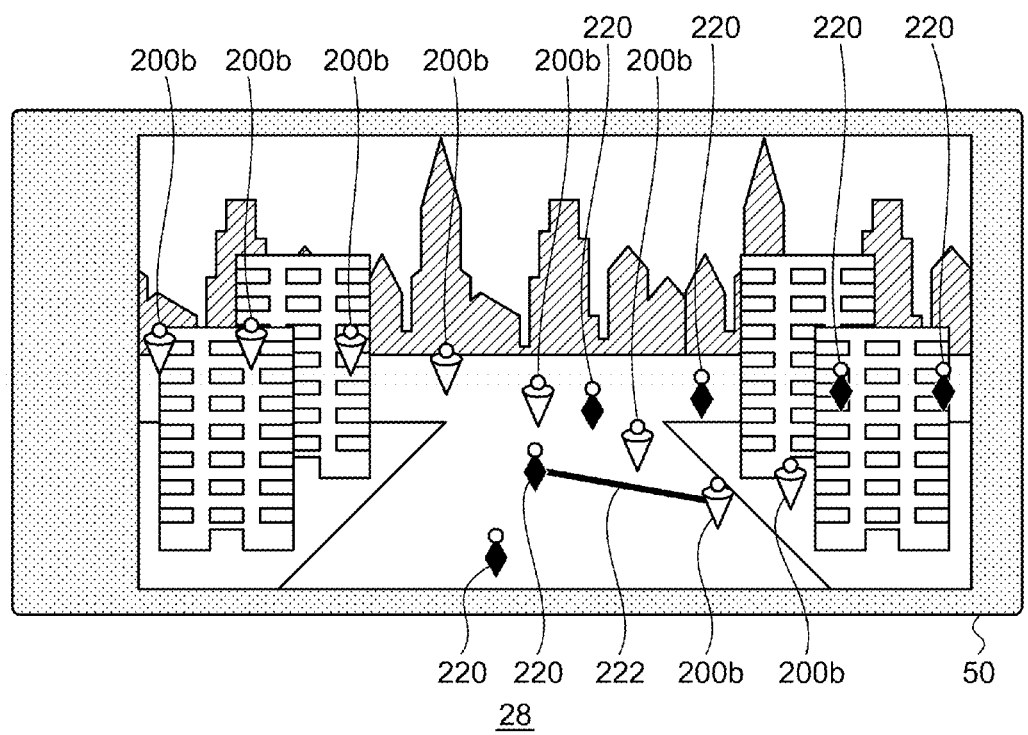
FIG. 13 shows the image generated by the processing unit according to Embodiment 3.

FIG. 13 shows the image 50 generated by the processing unit 28 according to Embodiment 3. As shown in the figure, the plurality of second other device icons 200b are shown and a plurality of host device icons 220 are shown in accordance with the history. As described above, the second other device icon 200b corresponds to the second mobile terminal device 10b and the host device icon 220 corresponds to the first mobile terminal device 10a. Further, one of the second other device icon 200b and one of the host device icons 220 are connected by a past correspondence line 222. To help understand the drawing clearly, only one past correspondence line 222 is shown, but a plurality of past correspondence lines 222 may be shown. As in the case of the transmission channel line 204, the state of displaying the past correspondence line 222 may be changed depending on the signal intensity.

Such a display scheme facilitates identifying the mutual relationship between the other mobile terminal devices 10 and the user's mobile terminal device 10. If the other device icons 200 or the host device icons 220 on the locus overlap, the newer one is displayed in front. The mobile terminal device may be configured to give an instruction to designate which of the other device icon 200 and the host device icon 220 that overlap should be displayed in front. Further, the relevant past information on the communication system 100 or the past signal intensity may be displayed by tapping the other device icon 200 or the host device icon 220. Such a display scheme facilitates searching for a position where the communication quality will be improved when the signal intensity at the current position is low, by referring to a position where communication was properly made in the past. The display scheme also facilitates patrolling and monitoring operations by helping formulating or changing a future patrolling route because the past route of the user of the mobile terminal device 10 or other party can be easily identified. Where a plurality of mobile terminal devices 10 are used in patrolling and monitoring operations, for example, an efficient patrol can be performed by avoiding a route visited by other mobile terminal devices 10 within a certain period of time in the past.

According to this embodiment, the history of the coordinates of the positions of the user's mobile terminal device and the history of the coordinates of the positions of the other mobile terminal devices are stored. Therefore, the movement locus of the other device icons and the movement locus of the host device icons can be displayed in the image. Further, a past correspondence line associating those of a plurality of other device icons and a plurality of host device icons that correspond to each other is displayed. Therefore, the user viewing the display finds it easy to understand when and where the communication took place in the past. The signal intensity is also displayed. Therefore, the user viewing the display finds it easy to understand when, where, and with what communication quality the communication took place in the past. Since the display facilitates understanding when, where, and with what communication quality the communication took place in the past, the status of good communication quality can be easily regained when the communication quality becomes poor.

Embodiment 4

A description will be Embodiment 4. As in the foregoing embodiments, the mobile terminal device according to Embodiment 4 uses AR technology to display other device icons representing other mobile terminal devices in a captured image. Embodiment 4 is directed to outputting an instruction to the other mobile terminal device based on the information shown in the image. The communication system 100, the base station device 12, the mobile terminal device 10 according to Embodiment 4 are of the same type as those of FIGS. 1 and 2. The following description concerns a difference from Embodiment 1.

Figure 14:
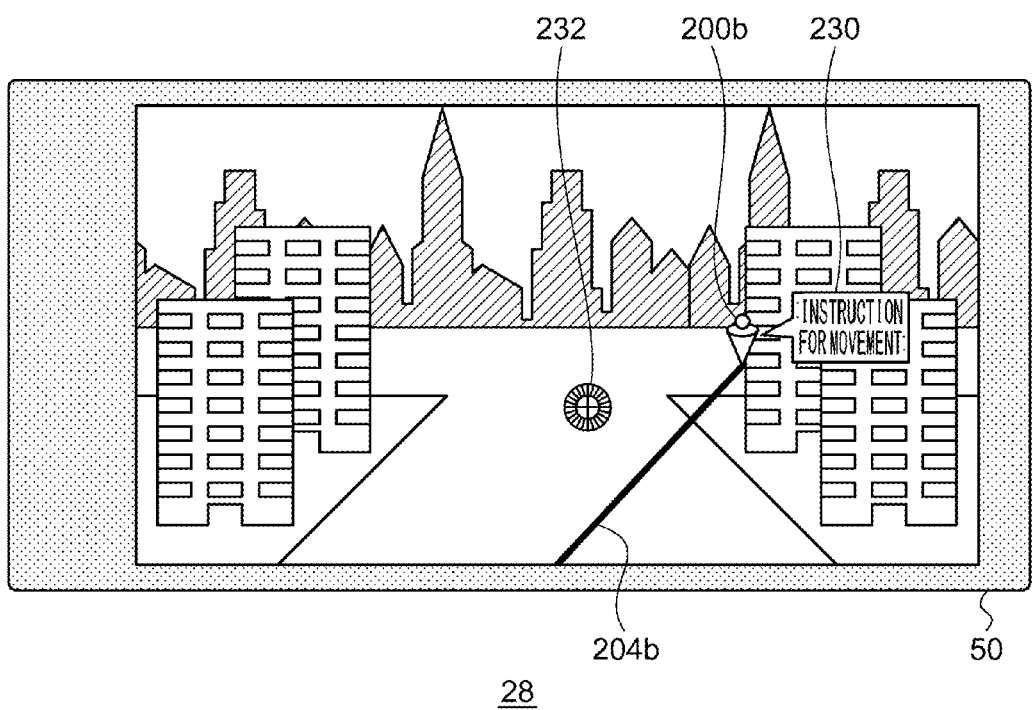
FIG. 14 shows the image generated by the processing unit according to Embodiment 4.

FIG. 14 shows the image 50 generated by the processing unit 28 according to Embodiment 4. As in FIG. 3, etc., the image 50 shows the second other device icon 200b and the second transmission channel line 204b. As the user taps the neighborhood of the second other device icon 200b in the image 50 shown in the display unit 32, a sub-menu 230 is displayed. The user selects "movement instruction" in the sub-menu 230. As the user subsequently taps a position that the user would like to guide the user of the second mobile terminal device 10b to move to, a destination icon 232 is displayed in the image 50. The processing unit 28 derives the latitude and longitude (third positional information) using the first positional information stored in the storage unit 30 and based on the coordinates of the destination icon 232. The processing unit 28 transmits the latitude and longitude thus derived (third positional information) or movement instruction information based on the third positional information to the second mobile terminal device 10*b* via the communication unit 22.

The second mobile terminal device 10*b* receiving the movement instruction displays a navigation screen showing a route of movement to the destination on the display unit 32. The processing unit 28 of the first mobile terminal device 10*a* may calculate a relative position of the destination of movement (third positional information) with reference to the current position of the second mobile terminal device 10*b* (second positional information) and generate a text message or an automatically generated voiced message telling to "move 30 m east," without using an augmented reality screen or a map screen. These messages are also transmitted to the second mobile terminal device 10*b*.

According to this embodiment, the position desired as a destination of movement is shown in the image so that a movement instruction can be easily output. When the movement instruction is received, a navigation screen guiding the user to the position indicated by the movement instruction is displayed. Accordingly, the movement is facilitated. The signal intensity is shown in the image so that the other mobile terminal device can be guided to a position where the communication quality is likely to be improved.

Described above is an explanation based on an exemplary embodiment. The embodiment is intended to be illustrative only and it will be obvious to those skilled in the art that various modifications to constituting elements and processes could be developed and that such modifications are also within the scope of the present invention.

According to Embodiments 1 through 4, a wireless business system is used in the communication system 100. Alternatively, wireless communication systems other than a business wireless system may be used, for example. According to this variation, the flexibility of the system can be improved.

What is claimed is:

1. A mobile terminal device comprising:
   a positioning unit that identifies first positional information of the mobile terminal device;
   a communication unit that communicates with another mobile terminal device and acquires second positional information identified in the other mobile terminal device;
   an imaging unit that captures an image of an environment surrounding the mobile terminal device; an acquisition unit that acquires information related to a status dependent on an environment surrounding the other mobile terminal device; and
   a display unit that displays, in an image captured by the imaging unit, another device icon indicating the other mobile terminal device at coordinates derived based on the first positional information identified by the positioning unit and the second positional information acquired by the communication unit, and displays the information acquired by the acquisition unit in association with the other device icon;
   wherein the acquisition unit measures, as the information indicating the status dependent on the environment surrounding the other mobile terminal device, a signal intensity of a signal received by the communication unit from the other mobile terminal device, and the display unit displays the signal intensity measured by the acquisition unit in association with the other device icon.

2. A mobile terminal device comprising:
   a positioning unit that identifies first positional information of the mobile terminal device;
   a communication unit that communicates with another mobile terminal device and acquires second positional information identified in the other mobile terminal device;
   an imaging unit that captures an image of an environment surrounding the mobile terminal device; an acquisition unit that acquires information related to a status dependent on an environment surrounding the other mobile terminal device; and
   a display unit that displays, in an image captured by the imaging unit, another device icon indicating the other mobile terminal device at coordinates derived based on the first positional information identified by the positioning unit and the second positional information acquired by the communication unit, and displays the information acquired by the acquisition unit in association with the other device icon;
   wherein the acquisition unit acquires, as the information indicating the status dependent on the environment surrounding the other mobile terminal device, a signal intensity measured in the other mobile terminal device, and the display unit displays the signal intensity acquired by the acquisition unit in association with the other device icon.

3. The mobile terminal device according to claim 1, wherein the display unit changes a state of display of the signal intensity in accordance with a value of the signal intensity measured by the acquisition unit.

4. The mobile terminal device according to claim 2, wherein
   the display unit changes a state of display of the signal intensity in accordance with a value of the signal intensity measured by the acquisition unit.

5. A mobile terminal device comprising:
   a positioning unit that identifies first positional information of the mobile terminal device;
   a communication unit that communicates with another mobile terminal device and acquires second positional information identified in the other mobile terminal device;
   an imaging unit that captures an image of an environment surrounding the mobile terminal device; an acquisition unit that acquires information related to a status dependent on an environment surrounding the other mobile terminal device; and
   a display unit that displays, in an image captured by the imaging unit, another device icon indicating the other mobile terminal device at coordinates derived based on the first positional information identified by the positioning unit and the second positional information acquired by the communication unit, and displays the information acquired by the acquisition unit in association with the other device icon;
   wherein the acquisition unit acquires, as the information indicating the status dependent on the environment surrounding the other mobile terminal device, status information transmitted from the other mobile terminal device and received by the communication unit, and the display unit displays the status information acquired by the acquisition unit in association with the other device icon.

6. The mobile terminal device according to claim 5, wherein
   the display unit displays the other device icon at further coordinates different from the coordinates derived based on the first positional information and the second positional information, and also displays information related to a relationship between the further coordinates and the coordinates.

7. A mobile terminal device comprising:
a positioning unit that identifies first positional information of the mobile terminal device;
a communication unit that communicates with another mobile terminal device and acquires second positional information identified in the other mobile terminal device;
an imaging unit that captures an image of an environment surrounding the mobile terminal device; an acquisition unit that acquires information related to a status dependent on an environment surrounding the other mobile terminal device;
a display unit that displays, in an image captured by the imaging unit, another device icon indicating the other mobile terminal device at coordinates derived based on the first positional information identified by the positioning unit and the second positional information acquired by the communication unit, and displays the information acquired by the acquisition unit in association with the other device icon; and
a storage unit that stores a history of the first positional information and a history of the second positional information;
wherein the display unit displays, in the image captured by the imaging unit, other device icons at respective coordinates derived from the history of the first positional information and the history of the second positional information stored in the storage unit, displays a host device icon indicating the mobile terminal device at respective coordinates derived from the history of the first positional information stored, and displays a presentation for associating those of a plurality of other device icons and a plurality of host device icons that correspond to each other.

* * * * *